(12) United States Patent
Zhang

(10) Patent No.: US 6,418,037 B1
(45) Date of Patent: Jul. 9, 2002

(54) COMPUTER SYSTEM WITH HYBRID POWER DISTRIBUTION

(75) Inventor: Michael T. Zhang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/641,419

(22) Filed: Aug. 16, 2000

(51) Int. Cl.$^7$ .................... H02M 3/335; G05F 1/577

(52) U.S. Cl. ........................... 363/15; 323/267

(58) Field of Search .................. 363/15, 16, 34; 323/266, 267, 282

(56) References Cited

U.S. PATENT DOCUMENTS 5,119,013 A * 6/1992 Sabroff ................. 323/267
5,455,501 A * 10/1995 Massie ................. 323/267
5,528,480 A * 6/1996 Kikinis et al. ........... 363/15

* cited by examiner

Primary Examiner—Jessica Han
(74) Attorney, Agent, or Firm—Mark V. Seeley

(57) ABSTRACT

A power supply for a computer is disclosed. The power supply is capable of providing power in both a DC domain and a high frequency AC domain. A first power consuming component can be coupled to the power supply to receive power in the DC domain, and a second power consuming component can be coupled to the power supply to receive power in the high frequency AC domain.

8 Claims, 2 Drawing Sheets

COMPUTER SYSTEM WITH HYBRID POWER DISTRIBUTION

FIELD OF THE INVENTION

The present invention relates to power distribution in computer systems.

BACKGROUND OF THE INVENTION

Computers generally rely on direct current (DC) power distribution to provide power to various components. DC power distribution typically operates in the following manner. The computer's main power supply converts low frequency (e.g., 60 Hz) alternating current (AC) power received from a power source into DC power. That power supply then converts that DC power into high frequency AC power. The high frequency AC power is then stepped down, converted back to DC power, and filtered. The resulting filtered DC power is then provided via a connector or bus to a voltage regulator or other power consuming component.

To reduce cost and part-count inherent in such a DC power distribution system, and to enhance power delivery efficiency, a high frequency AC power distribution system has been proposed. See Ser. No. 09/312,256 filed May 14, 1999, and assigned to this application's assignee. In such a power distribution system, the computer's main power supply converts low frequency (AC) power received from a power source into DC power, then converts that DC power into high frequency AC power—as is done in a DC power distribution system. Unlike DC power distribution, however, the proposed high frequency AC power distribution system delivers high frequency AC power to a power consuming component, e.g., a voltage regulator, over an AC bus.

Although the proposed high frequency AC power distribution system may reduce system cost for power delivery and improve power delivery performance, such high frequency distribution, e.g., over a computer motherboard, could adversely affect signal integrity and pose troublesome EMI and layout issues.

Accordingly, there is a need for improved power distribution for a computer. There is a need for a system that provides the benefits of high frequency AC power distribution while minimizing potentially harmful effects. The hybrid power distribution architecture of the present invention provides such a system.

DETAILED DESCRIPTION OF THE PRESENT INVENTION

A power supply for a computer is described. The power supply provides power in both a DC domain and a high frequency AC domain. A first power consuming component can be coupled to the power supply to receive power in the DC domain, and a second power consuming component can be coupled to the power supply to receive power in the high frequency AC domain.

In the following description, numerous details are set forth to provide a thorough understanding of the present invention. However, it will be apparent to those skilled in the art that the invention may be practiced in many ways other than those expressly described here. The invention is thus not limited by the specific details disclosed below.

Figure 1:
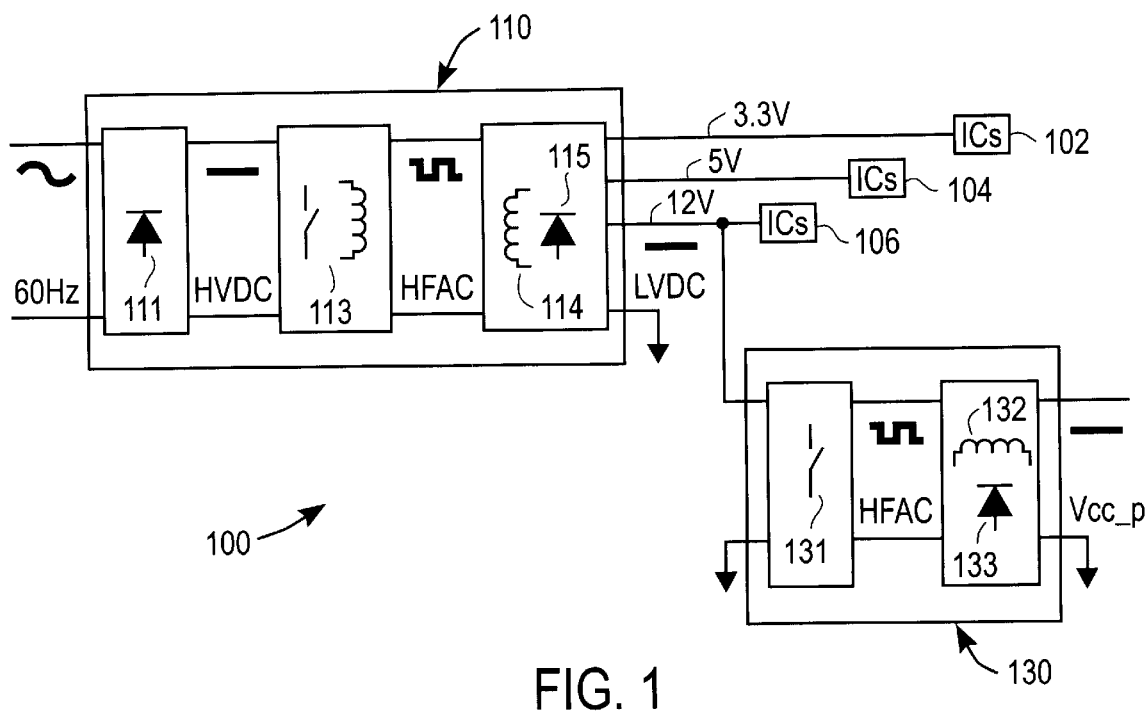
FIG. 1 illustrates a conventional DC distributed power architecture.

FIG. 1 illustrates a conventional DC distributed power architecture. DC power distribution system 100 includes main power supply 110 and voltage regulator 130. Power supply 110 receives power from a power source (e.g., utility power accessed via a wall socket) and performs a number of operations on it prior to delivering DC power to voltage regulator 130. Power supply 110 includes first rectifier 111, which receives power in a low frequency AC domain from the power source. Rectifier 111 converts the AC power to DC power. A filter (not shown) may be coupled to rectifier 111 to reduce ripple in the DC power.

First switch 113 is coupled to rectifier 111, e.g., via the filter. Switch 113 receives the DC power and converts it to high frequency AC power. First transformer 114 is coupled to switch 113. Transformer 114 receives the high frequency AC power and steps it down to a lower voltage. Second rectifier 115 is coupled to transformer 114. Rectifier 115 receives the low voltage high frequency AC power and converts it to DC power. A second filter (not shown) may be coupled to rectifier 115 for receiving DC power from the rectifier and filtering away noise prior to distribution of the DC power to voltage regulator 130 and integrated circuits 102, 104 and 106.

In DC power distribution system 100, voltage regulator 130 receives DC power from power supply 110 and further regulates it before delivering power to a power consuming component. Voltage regulator 130 includes second switch 131, which receives DC power from power supply 110 and converts it to AC power. In some embodiments of the present invention, a second transformer 132 is coupled to switch 131. In other embodiments, that transformer is omitted. When transformer 132 is used, it receives the AC power and steps it down to a lower voltage. Third rectifier 133, which is coupled to transformer 132, receives the low voltage AC power and converts it to DC power. A filter (not shown) may be coupled to rectifier 133 for receiving the DC power and filtering away ripple from it. The DC power is then delivered to a power consuming component, for example, a microprocessor (not shown).

Figure 2:
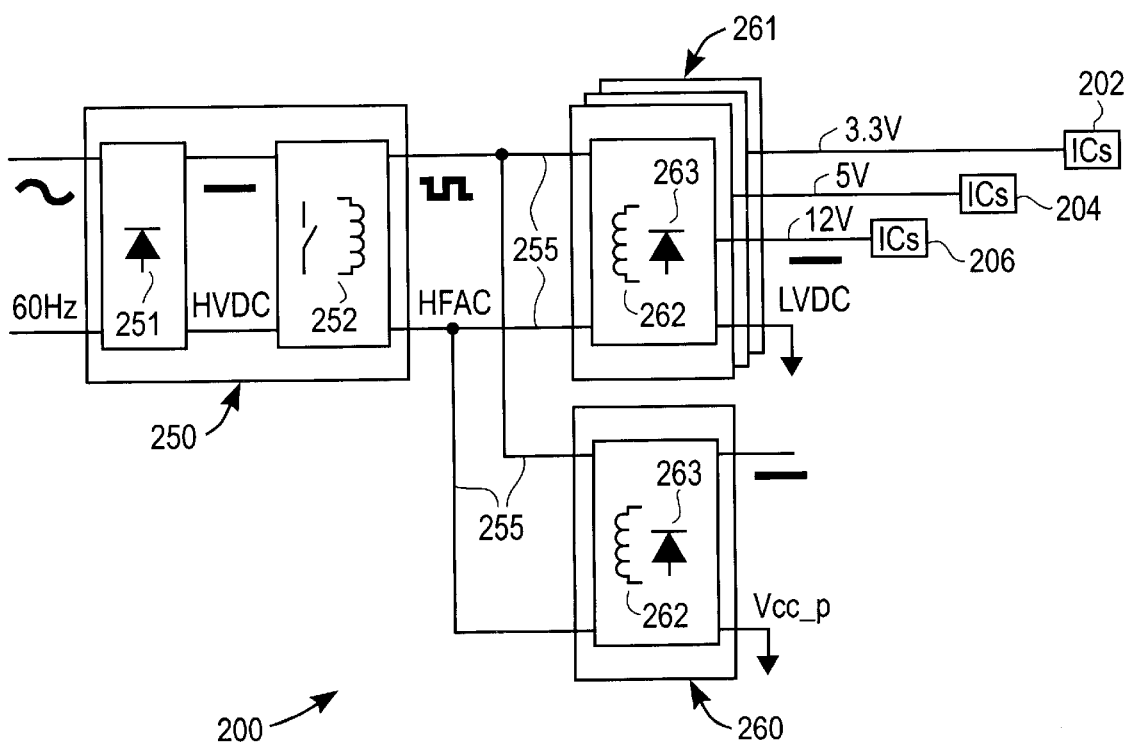
FIG. 2 illustrates a high frequency AC distributed power architecture.

FIG. 2 illustrates a high frequency AC distributed power architecture that has been proposed to simplify power distribution for a computer. That architecture, as described below, eliminates a number of intermediate power conversion stages, which are used in the conventional DC power distribution architecture. Removing those intermediate stages may reduce power delivery system cost and may improve power delivery performance.

High frequency AC power distribution system 200 includes power supply 250 and voltage regulators 260 and 261. Power supply 250 receives power from a power source such as a wall socket (not shown), and performs a number of operations on it prior to delivering high frequency AC power to the voltage regulators. Power supply 250 includes first rectifier 251, which receives power in a low frequency AC domain from the power source. Rectifier 251 converts the AC power to DC power. Switch 252, which is coupled to rectifier 251, receives the DC power and converts it to high frequency AC power. A resonant circuit (not shown) may be coupled to switch 252 for receiving that high frequency AC power and smoothing it before transmitting it over AC bus 255 to the voltage regulators. Such a resonant circuit may include a capacitive element and an inductive element. A controller (not shown) may be coupled to AC bus 255 and switch 252 to monitor voltage and current levels at the output of power supply 250. Such a controller may adjust switch 252 to ensure that the power delivered over AC bus 255 is provided at a predetermined level.

High frequency AC voltage regulators 260 and 261 receive power in the AC domain from AC bus 255 and regulate it to voltage and current levels appropriate for a microprocessor (not shown) and integrated circuits 202, 204, and 206. Regulators 260 and 261 each include transformer 262, which receives high frequency AC power from AC bus 255 and steps it down to a lower voltage. Rectifier 263, which is coupled to transformer 262, receives the low voltage high frequency AC power from the transformer, then converts it into the DC power domain. A filter may receive the DC power and filter away ripple from the DC power before it is delivered to the power consuming components, e.g., a microprocessor and integrated circuits 202, 204 and 206.

Power supply 250 and voltage regulators 260, 261 enable power distribution in a high frequency AC domain. Distribution of power in that domain may improve the reliability of voltage regulation for components that have high di/dt requirements—e.g., microprocessors. In addition, unlike DC power distribution systems, this architecture does not require dual AC/DC conversion. Despite these benefits, such a high frequency AC power distribution system may create other problems—e.g., those associated with EMI, signal integrity, and layout.

Figure 3:
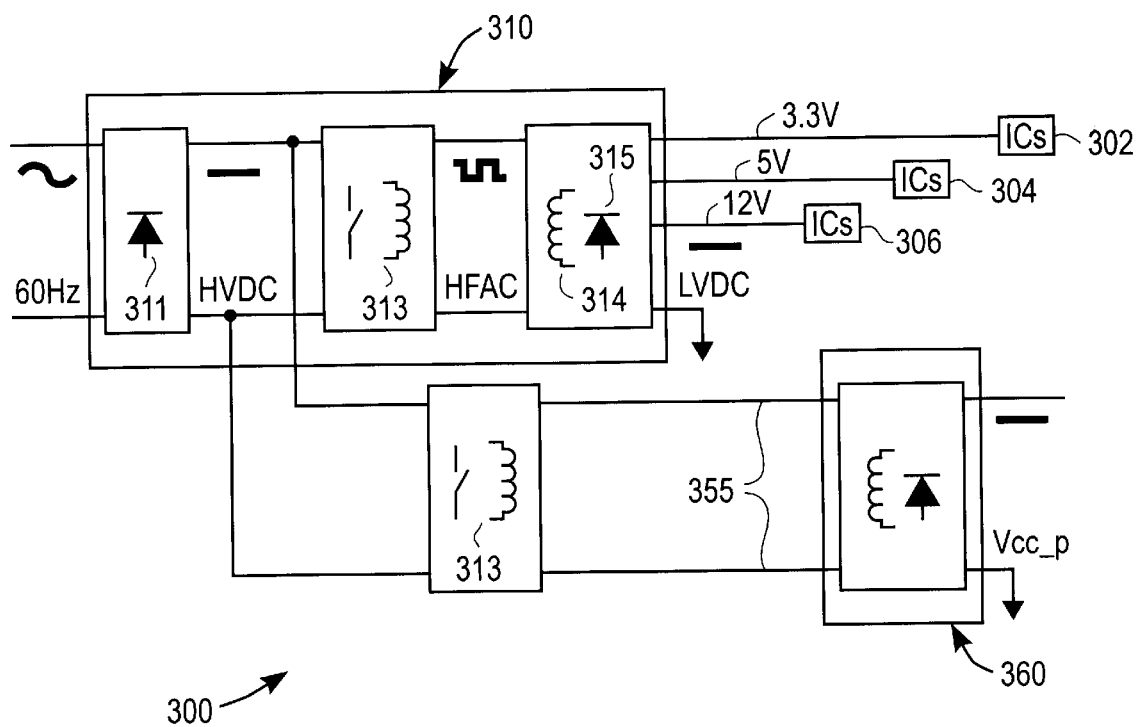
FIG. 3 illustrates an embodiment of the hybrid distributed power architecture of the present invention.

FIG. 3 illustrates an embodiment of the hybrid power distribution architecture of the present invention, which provides the benefits of high frequency AC power distribution while minimizing potentially harmful effects that such a power distribution system may cause. In this embodiment of the present invention, hybrid power distribution system 300 includes power supply 310 and voltage regulator 360. Power supply 310 receives power from a power source and processes it prior to delivering DC power to a first power consuming component and delivering high frequency AC power to a second power consuming component. Power supply 310 includes first rectifier 311, which receives power in a low frequency AC domain from the power source and converts it to DC power.

First switch 312 and second switch 313 are coupled to rectifier 311. Switches 312 and 313 receive DC power and convert it to high frequency AC power. Transformer 314 receives high frequency AC power from switch 312 and steps it down to a lower voltage. Second rectifier 315, which is coupled to transformer 314, receives the low voltage high frequency AC power and converts it to DC power. That DC power is then delivered to one or more power consuming components. In this embodiment of the present invention, DC power is distributed at 3.3 volts, 5 volts and 12 volts to integrated circuits 302, 304 and 306, respectively.

Although in this embodiment of the present invention, these voltages are provided directly to these integrated circuits, alternative embodiments may include one or more voltage regulators for receiving the DC power and further regulating it prior to delivery to the integrated circuits. When power supply 310 sources multiple voltages, transformer 314 may have multiple windings. In such a system, power supply 310 may include rectifiers and filters for coupling power from several transformer windings to integrated circuits or voltage regulators at different voltages.

DC power may be delivered from rectifier 315 to various types of integrated circuits, including various types of memory devices or controllers (e.g., those associated with memory, I/O, display, storage, audio, graphics, input/output devices like a keyboard, mouse or joystick, etc . . . ) Power may be delivered directly to some of these integrated circuits, or instead further regulated via one or more voltage regulators.

Unlike the high frequency AC power that switch 312 generates, high frequency AC power that switch 313 generates is delivered over AC bus 355 to a second power consuming component—without first being converted to the DC power domain. That high frequency AC power, in this embodiment of the present invention, is delivered to voltage regulator 360, which represents the second power consuming component in this embodiment of the present invention. Voltage regulator 360 includes components like those included in voltage regulator 260, described above, and serves—in this embodiment—to regulate power for a microprocessor.

The present invention may be implemented in systems that include a single processor or multiple processors. Those skilled in the art will appreciate that various filters may be included in power supply 310, although not shown in FIG. 3. Although this embodiment of the present invention shows high frequency AC power delivered over AC bus 355 only to a voltage regulator for providing Vcc to a microprocessor, alternative embodiments can provide high frequency AC power to additional components—while retaining low voltage DC power distribution to others.

Various rectifiers, switches, transformers, controllers, filters, resonant circuits, etc . . . , which may be used to make the hybrid power distribution system of the present invention, may be made using circuits that are conventionally used to make such power supply and voltage regulator components. Such components may all reside on a single semiconductor, or instead be located on several semiconductors. Although this embodiment of the present invention shows a single integrated unit for distributing power in both the DC domain and the high frequency AC domain, the hybrid power distribution system of the present invention could instead employ a power supply that uses separate devices to produce power in the DC domain and power in the high frequency AC domain.

The hybrid power distribution architecture of the present invention enables high frequency AC power conversion for microprocessor power delivery while retaining traditional DC power conversion for other components. This architecture thus enables high frequency AC power distribution to be Used where it provides the. most significant cost benefits, e.g., Vcc for microprocessor power—a power conversion that requires multiple stages and high performance. Microprocessor power conversion is typically performed using either a plug-in voltage regulator module or embedded regulator in a confined area of a motherboard. Consequently, using high frequency AC power distribution for the microprocessor, unlike using this form of power distribution for other components, may not present significant system level risks.

An improved power distribution system has been described. That distribution system enables delivery of power in a high frequency AC domain to power consuming components that benefit significantly from that form of power distribution, while power is delivered to non-critical components in a DC domain. This combination enables the benefits of high frequency AC power distribution to be realized while minimizing potential adverse impact to the system.

Additional components that may be included in the illustrated power distribution system have been omitted as they are not useful to describe aspects of the present invention. Although the foregoing description has specified a power distribution architecture that includes certain features, those skilled in the art will appreciate that many modifications and substitutions may be made. Accordingly, it is intended that all such modifications, alterations, substitutions and additions be considered to fall within the spirit and scope of the invention as defined by the appended claims.

What is claimed is:

1. A power supply for a computer comprising:
   means for providing power in a direct current (DC) domain from the power supply to a first power consuming component; and
   means for providing power in a high frequency alternating current (AC) domain from the power supply to a second power consuming component;
   wherein the means for providing power in a high frequency AC domain comprises:
      means for converting low frequency AC power into DC power;
      means for converting the DC power into high frequency AC power; and
      means for providing the high frequency AC power to the second power consuming component.

2. The powersupply of claim 1 wherein the means for providing power in a DC domain distributes power at a plurality of voltages.

3. The power supply of claim 2 wherein voltages are distributed at about 3.3 volts, about 5 volts and about 12 volts.

4. The power supply of claim 1 wherein the means for providing power in a DC domain comprises:
   means for converting low frequency AC power into DC power;
   means for converting the DC power into high frequency AC power;
   means for stepping the high frequency AC power down to a lower voltage level;
   means for converting the low voltage high frequency AC power to DC power; and
   means for providing the DC power to the first power consuming component.

5. A method for delivering power in a computer to a plurality of power consuming components comprising:;
   providing power in a DC domain from a power supply to a first power consuming component; and
   providing power in a high frequency AC domain from the power supply to a second power consuming component;
   wherein the step of providing power in the high frequency AC domain to the second power consuming component comprises:
      converting low frequency AC power into DC power;
      converting the DC power into high frequency AC power; and
      providing the high frequency AC power to the second power consuming component.

6. The method of claim 5 wherein the step of providing power in the DC domain to the first power consuming component comprises:
   converting low frequency AC power into DC power;
   converting the DC power into high frequency AC power;
   stepping the high frequency AC power down to a lower voltage level;
   converting the low voltage high frequency AC power to DC power; and
   providing the DC power to the first power consuming component.

7. The method of claim 5 wherein the second power consuming component is a voltage regulator that distributes a Vcc voltage to a microprocessor.

8. The method of claim 7 wherein the voltage regulator comprises:
   a transformer for receiving high frequency AC power at a first voltage and stepping the high frequency AC power down to a lower voltage;
   a rectifier for converting the high frequency AC power to a DC domain; and
   an output port for providing the DC power to the microprocessor.

* * * * *

UNITED STATES PATENT AND TRADEMARK OFFICE
CERTIFICATE OF CORRECTION

PATENT NO. : 6,418,037 B1
DATED : July 9, 2002
INVENTOR(S) : Zhang

It is certified that error appears in the above-identified patent and that said Letters Patent is hereby corrected as shown below:

Column 4,
Line 49, delete "Used", insert -- used --.

Signed and Sealed this

Eighteenth Day of February, 2003

JAMES E. ROGAN
*Director of the United States Patent and Trademark Office*